United States Patent
Szczyrbak et al.

[11] Patent Number: 5,479,096
[45] Date of Patent: Dec. 26, 1995

[54] ANALOG SENSING SYSTEM WITH DIGITAL TEMPERATURE AND MEASUREMENT GAIN AND OFFSET CORRECTION

[75] Inventors: Jackson Szczyrbak, Newport News; Karmjit Sidhu, Yorktown, both of Va.; Oleg Boyarsky, Cherry Hill, N.J.

[73] Assignee: Lucas Industries, Inc., Reston, Va.

[21] Appl. No.: 286,251

[22] Filed: Aug. 8, 1994

[51] Int. Cl.$^6$ .............................. G01R 15/00; G06F 11/30
[52] U.S. Cl. ................ 324/132; 364/571.01; 364/571.07; 73/708
[58] Field of Search ................ 73/708, 766, 1 R, 73/766; 324/132; 364/571.01–571.08

[56] References Cited

U.S. PATENT DOCUMENTS

| | | | |
|---|---|---|---|
| 4,765,188 | 4/1988 | Krechmery et al. | 73/708 |
| 5,048,343 | 9/1991 | Oboodi et al. | 73/766 |
| 5,121,118 | 6/1992 | Hermann | 364/571.01 |
| 5,135,002 | 8/1992 | Kirchner et al. | 73/708 |
| 5,146,788 | 9/1992 | Raynes | 73/708 |

*Primary Examiner*—Ernest F. Karlsen
*Assistant Examiner*—Russell M. Kobert
*Attorney, Agent, or Firm*—Nixon & Vanderhye

[57] ABSTRACT

Disclosed is a digital correction system for application to an analog parameter measurement transducer. A temperature sensor, either separate from or incorporated into a parameter measurement transducer provides a temperature signal which is converted by an A-to-D converter to address temperature gain and offset corrections. These corrections are applied to a preamplifier amplifying the output of the transducer. The preamplifier output which has been temperature gain and offset corrected, is applied as an input to a final stage amplifier and also to a further A-to-D converter which addresses a storage device including transducer gain and offset corrections. The transducer gain and offset corrections are applied to the final stage amplifier so that the analog sensor output is corrected for temperature effects and for transducer nonlinearities. Various preferred embodiments can utilize two amplifiers or a single amplifier and can be driven by constant voltage or constant current power supplies for supplying power to the transducer.

16 Claims, 5 Drawing Sheets

ANALOG SENSING SYSTEM WITH DIGITAL TEMPERATURE AND MEASUREMENT GAIN AND OFFSET CORRECTION

BACKGROUND OF THE INVENTION

1. Field of the Invention

The present invention relates generally to the field of corrected analog sensing systems and specifically to an analog transducer sensing system which includes temperature gain and offset as well as transducer gain and offset corrections.

2. Background of the Prior Art

Measurements obtained from transducers or sensors are affected by inherent static errors as well as thermal drifts. The static errors are in the form of linearity, repeatability and hysteresis effects which are a function of the specific transducer and transducer type. Thermal errors result in zero offset and sensitivity changes over the operating temperature range of the transducer which, in the case of piezoresistors, can be highly nonlinear.

Sensors employing various measurement parameter transducers historically have been used to provide an electrical output signal which is related to changes in the parameter being measured. Many times this parameter is the strain on a particular structure and, depending upon the mechanical arrangements of the structure, can be indicative of acceleration, torque, pressure, etc. More recently, there has been significant growth in microtransducers which utilize micromachining of silicon to provide extremely small pressure and acceleration sensors. These sensors employ piezoresistive areas on the silicon to provide a variable resistance output as the silicon is strained.

The outputs of such transducers are generally non-linear and offset. By linearity (or gain) of the transducer output is meant the relative change in output reading for a given change in the measurement parameter and such linearity can change as a function of the transducer output. By offset, it is meant the transducer output with a zero or reference measurement parameter input which is a function of temperature. This can be expressed by the equation: electrical output=a(mechanical input)+offset where "a" may be a function of the mechanical input itself ("a" would be a constant if the transducer were linear). Furthermore, there can be temperature related gain effects ("a" changes as a function of temperature) as well as temperature related offset effects which will change the output reading of the transducer without any variation in the measured parameter. Unfortunately, many transducers have nonlinear outputs and also have variations in signal offset depending upon the level of the parameter to be measured.

It is highly desirable that such transducers provide a linear output signal which is proportional to the parameter being measured over the useful range. Because of the above described temperature gain and offset errors, as well as the measurement parameter gain and offset errors (which are a function of the transducer), require extensive calibration of measurement transducers over the entire operating range of temperatures and parameters being measured. These are generally in the form of correction tables which are then utilized to manually or with computer implementation, correct the sensor output.

While the output from such sensors is in an analog form, traditional analog compensation of these errors is extremely time consuming and is not very accurate especially for nonlinear errors. Attempts have been made in the past to improve upon such systems and are exemplified by U.S. Pat. No. 4,399,515 issued to Gross on Aug. 16, 1983 and U.S. Pat. No. 4,912,397 issued to Gale et al. on Mar. 27, 1990.

In the Gross patent, there is shown in FIG. 1 a bridge type silicon diaphragm pressure sensor in which temperature induced linearity (or gain) errors and temperature offset errors are corrected as a result of the output of offset DAC (Digital-to-Analog Converter) 16 being used to correct sensor amplifier 14. Thermal induced changes in the sensor itself are taken into account by the thermal shift DAC 21 and its output is applied to programmable gain output amplifier 22. It is noted that the thermal shift and the sensitivity shift analog outputs, which are supplied as inputs to programmable gain output amplifier 22, are all based upon the digital temperature address provided by ADC (Analog-to-Digital Converter) 20.

The drawback of such a system is that, while it preserves the benefits of an analog signal bandwidth, it has no ability to correct transducer gain and offset errors which can be more significant than temperature related gain and offset errors.

The Gale patent teaches, in FIG. 2, the linearization or correction of a non-linear transducers output by conversion of one portion of the output to a digital signal which addresses memory 4. The digital data stored in the memory is accessed by the digital address and then reconverted into an analog correction. The correction is applied to summer 6 which includes as another input the transducer output and provides a corrected linear output signal. There is no indication that this correction includes "offset" for the transducer and there certainly is no provision for temperature induced linearity correction or temperature offset correction.

Neither the Gale patent nor the Gross patent provide a system for complete correction of a transducer analog output signal. It is particularly important to maintain the signal as an analog signal so as to preserve the relatively broad bandwidth of such a signal. If the signal is converted into a digital signal or address which is then applied to a digital correction table so as to read out a corrected digital signal output, even if this readout from a digital memory system is reconverted into an analog output signal, the bandwidth of the output signal is immediately decreased to the range of the digital memory and speed at which the digital memory can supply outputs reflecting changes in the inputs. Such a conversion to a digital signal and then reconversion back to the analog signal after correction provides a relatively poor accommodation to variations in temperature and transducer manufacturing effects.

Furthermore, when temperature effects on a transducer are to be corrected for, as in Gross above, often the temperature sensor is located a physical distance from the transducer and thus may not accurately indicate the actual temperature of the transducer.

SUMMARY OF THE INVENTION

In accordance with the above, it is an object of the present invention to provide an analog output from a transducer where the transducer is corrected for transducer gain and offset errors as well as thermally induced gain and offset errors.

It is a further object of the present invention to provide digital correction while maintaining an analog amplification system for the output of a transducer.

It is a still further object of the present invention to provide an analog system for amplifying the output of a resistive bridge sensor but to include digital correction of the output of the bridge sensor.

It is an additional object of the present invention to provide a method of temperature sensing which utilizes the transducer itself so as to avoid inaccuracies induced by the location of a temperature sensor apart from the transducer.

The above and other objects are achieved in accordance with one embodiment of the present invention in which a temperature signal either provided separately or as a function of the measurement parameter transducer, is supplied to an A-to-D converter which provides a temperature address to a temperature gain and offset correction storage. This address causes the storage to provide digital output corrections for temperature gain and offset which are applied to a preamplifier which has as its input the output of the measurement parameter transducer. The preamplifier provides most of the gain necessary to amplify the low level bridge signal.

The preamplifier output is supplied as an input to an amplifier and through an A-to-D converter to a transducer store which stores transducer gain and transducer offset corrections for the range of transducer outputs. The corresponding gain and offset corrections are applied to the amplifier whose output comprises the sensor output.

In a preferred embodiment, the transducer is a bridge circuit wherein the measurement parameter output is applied to a first preamplifier. Another output is taken from the non-measurement parameter portions of the bridge circuit so as to provide a temperature output which, in turn, is convened to a digital address and serves to address the temperature gain and offset correction storage. In a further embodiment, the temperature gain and offset correction store and the transducer gain and offset store are a single programmable read only memory.

BRIEF DESCRIPTION OF THE DRAWINGS

The above invention will be more completely understood by reference to the following drawings, wherein.

DETAILED DESCRIPTION OF PREFERRED EMBODIMENTS

Figure 1:
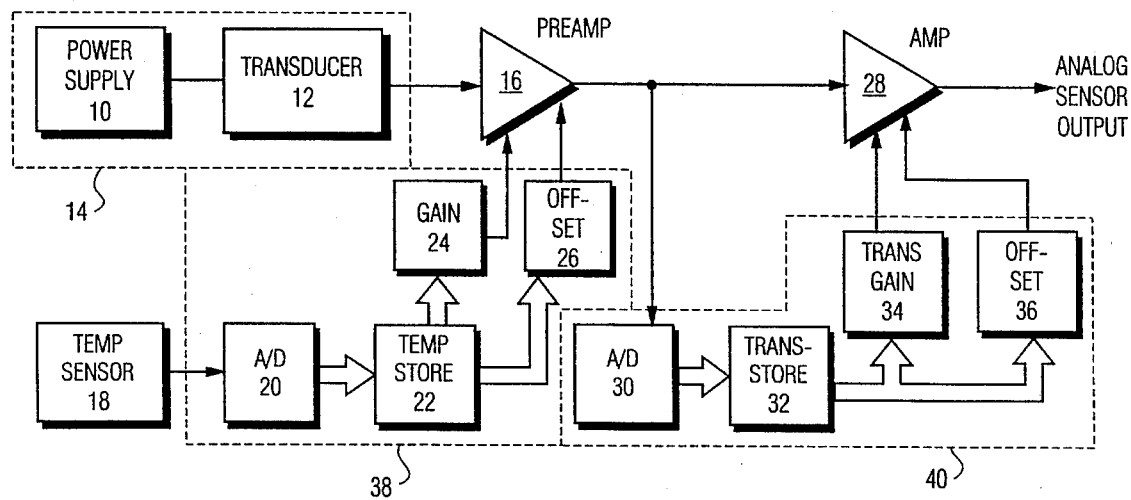
FIG. 1 is a is a block diagram of one embodiment of the present invention.

Similar elements are similarly labeled in the varying views of the present invention. In FIG. 1, power supply 10 supplies the necessary electrical power to the measurement parameter transducer 12 where the measurement parameter is a physical quantity such as pressure, acceleration, torque, etc. Appropriate power supplies could provide either constant voltage or constant current. The transducer, in a preferred embodiment, is a resistive bridge sensor. Together the power supply 10 and transducer 12 comprise a measurement parameter transducer 14 as shown by the dotted line block.

The measurement parameter transducer 14 provides an analog electrical output indicative of the measurement parameter being measured by transducer 12. This analog electrical output is supplied to preamp 16 which amplifies the transducer analog output and provides an analog preamplifier output. Temperature sensor 18 provides an electrical output related to the temperature of the transducer. In a practical embodiment, the temperature sensor would be mounted as close to the transducer as possible, if not incorporated into the transducer 12.

The analog temperature output is supplied to an A-to-D converter 20 which changes the analog temperature signal into a digital address. The digital address is applied to a temperature store 22 which is any one of a number of digitally address storage mediums, preferably a Programmable Read Only Memory (PROM). When addressed, the temperature store 22 provides a temperature gain correction output and a temperature offset correction output. The temperature gain correction output is applied to the gain block 24 and the temperature offset correction is applied to offset block 26. Gain block 24 and offset block 26 could be implemented either with an electronic potentiometer or a digital-to-analog converter.

The digital output from temperature store 22 is converted by the gain and offset blocks into analog signals which are supplied to adjust preamp 16. The gain analog signal from gain block 24 to the preamp adjusts the gain of the preamp to correct for temperature induced gain errors. In a similar fashion, offset block 26 supplies an analog signal to correct the offset of preamp 16. The processing of the temperature sensor input to form gain and offset corrections to the preamplifier can be considered a temperature gain and offset correction storage for providing temperature gain and offset correction outputs to the preamplifier as shown in FIG. 1 in the dotted line block 38. Accordingly, the output of preamp 16 will be the measurement parameter analog output corrected for both gain and offset temperature effects.

The analog preamplifier 16 output is supplied both as an input to amplifier 28 and to analog-to-digital converter 30. Amplifier 28 amplifies the temperature corrected analog preamplifier output to provide the desired analog sensor output. The analog-to-digital converter 30 provides a digital address indicative of the temperature corrected measurement parameter analog output and addresses an appropriate storage address in transducer store 32. Each of the addresses in the transducer store 32 include measurement parameter gain and offset corrections for different values of the analog preamplifier output which correct for the transducers gain and offset, respectively.

The digital output of the transducer store 32 is supplied to transducer gain block 34 and offset block 36 which, like the temperature gain block 24 and offset block 26 can be electronic potentiometers or digital-to-analog converters so as to provide an analog signal for correction of the gain and offset of amplifier 28. The processing of the temperature corrected analog preamp output to form gain and offset corrections to the amplifier 28 can be considered a measurement parameter gain and offset correction storage for providing measurement parameter gain and offset correction outputs to the analog amplifier as shown in FIG. 1 in the dotted line block 40.

As a result, the analog transducer output is generated in conventional analog fashion from the transducer through preamp 16 and amplifier 28 thereby preserving the wide bandwidth of such analog signal processing. However, at the same time, the analog sensor output has been corrected for temperature induced errors in gain and offset with respect to the transducer temperature and then the temperature corrected transducer output has been utilized to induce transducer gain and offset corrections into the amplifier 28. As a result, the analog sensor output is highly accurate and highly repeatable while maintaining a relatively wide bandwidth.

The temperature gain block 24 and temperature offset block 26, the transducer gain block 34 and transducer offset block 36 in a preferred embodiment are solid state trim potentiometers made by Hughes Aircraft Company Semiconductor Product Center, Newport Beach, Calif. available as Hughes HC2010 or HC2012 solid state trim potentiometers (the difference between the two relates to the resistance of the potentiometer with #2010 having a resistance of 1KΩ and #2012 having a resistance of 100KΩ). An important feature of such solid state trim potentiometers is that the output can go from ground to the full supply voltage and any point in between. While digital-to-analog converters could also be used, additional circuitry is generally necessary in order to provide an output which can change from ground to the full supply voltage.

While the present invention as shown in FIG. 1 is operational with any temperature sensor, a preferred embodiment of the present invention utilizes a transducer which includes a resistive bridge in the measurement parameter transducer and utilizes the resistors of the resistive bridge to provide a temperature measurement output. Obviously, since the same resistors being used to provide the measurement parameter output also provide the temperature indication output, errors due to thermal differences between a temperature sensor and its respective transducer are eliminated.

Figure 2:
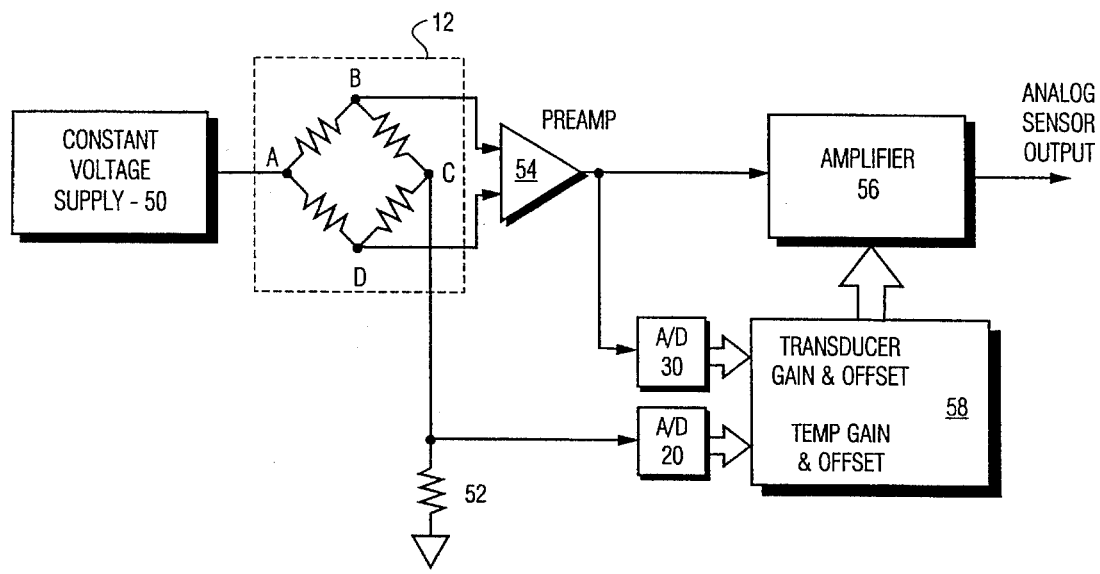
FIG. 2 is a is a block diagram of a further embodiment of the present invention.
Figure 3:
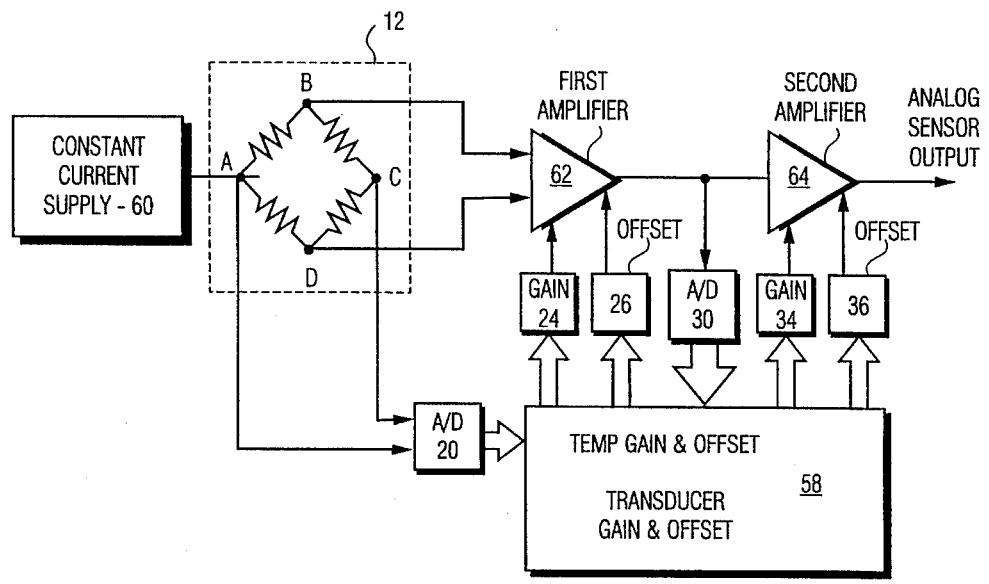
FIG. 3 is a block diagram illustrating a still further embodiment of the present invention.

Two embodiments of the temperature sensor being incorporated into the bridge circuit are shown in FIGS. 2 and 3. In FIG. 2, a constant voltage supply 50 supplies a constant voltage across junctions A and C of the resistance bridge comprising transducer 12. Series resistor 52 connects junction C of the bridge to ground. While a difference in voltage between junctions B and D will indicate a particular value of the measured parameter, the voltage dropped across the bridge between junctions A and C will generally not be affected by changes in the measurement parameter. However, the resistance between A and C will vary as the temperature of the bridge varies providing variations in voltage at junction C with respect to ground. It is this voltage variation that comprises an analog temperature input to A-to-D converter 20.

In the FIG. 2 embodiment, the uncorrected (for either temperature or transducer effects) measurement parameter output of the bridge across junction B and D is supplied to preamplifier 54 which serves to amplify the signal, but does not supply any temperature gain or offset correction. In fact, the preamplifier provides an amplified analog output to amplifier 56 and the A-to-D converter 30. If the output of the bridge is sufficient or the A-to-D converter 30 and amplifier 56 are sensitive enough, the preamplifier 54 could be dispensed with and the dual outputs of the bridge supplied directly, both to amplifier 56 and to the A-to-D converter.

As in FIG. 1, the A-to-D converters 20 and 30 provide digital address inputs to a digital store which in FIG. 2 is illustrated as a single digital store. It is understood of course that many of the components in FIG. 1 could be combined such as the temperature store 22 and transducer store 32. Such a single store is shown in FIGS. 2 and 3 as temperature gain and offset correction and measurement parameter gain and offset correction store 58. Amplifier 56 is indicated as being responsive to digital inputs indicative of temperature gain and offset corrections as well as transducer gain and offset corrections. Quite clearly, the gain correction applied to amplifier 56 can be a composite of the temperature gain error correction and the transducer gain error correction and the amplifier offset can be a combination of the temperature error offset correction and the transducer offset correction. If it were desirable to utilize an amplifier responsive to analog signals, the output of store 58 would be supplied to solid state potentiometers as discussed above and implemented in the fashion of gain block 34 and offset block 36 in FIG. 1.

FIG. 3 illustrates a constant current supply 60 which supplies a constant current input to the bridge circuit of the transducer 12 (note that while the constant current supply is shown in FIG. 3, the constant current supply and the constant voltage supply are interchangeable between the embodiments of FIGS. 2 and 3 as long as the outputs of A and C are properly accommodated). Again, as the measurement parameter changes, the voltage across junctions B and D of the bridge will change and it is this analog voltage output which is supplied to first amplifier 62. The voltage drop induced across junctions A and C of the bridge will vary depending upon the temperature of the resistive bridge as a whole and therefore the junctions A and C input to A-to-D converter 20 is an analog signal indicative of the temperature of the bridge. As in FIG. 2, a single store providing temperature gain and offset as well as transducer gain and offset corrections is accessed by the address provided from A-to-D converter 20 so as to provide digital outputs of temperature gain and temperature offset to the gain block 24 and the offset block 26, respectively, as in FIG. 1. The analog output from these two blocks is applied to first amplifier 62 so as to adjust its output to eliminate errors in gain and offset caused by temperature changes of the transducer 12.

Again, the analog output of a first amplifier is supplied both to second amplifier 64 and to A-to-D converter 30 which addresses the transducer gain and offset information stored in store 58. The digital information regarding transducer gain and offset is supplied to the gain block 34 and offset block 36, respectively, which provide analog inputs to the second amplifier 64 such that transducer errors in gain and offset are corrected. The result again is an analog sensor output which retains the wide bandwidth of analog processing, but includes the ease of digital correction.

Included in the temperature and transducer stores 22 and 32, respectively, of FIG. 1 and the temperature gain and offset and transducer gain and offset store 58 shown in FIGS. 2 and 3, is any necessary control circuitry for the appropriate timing of addressing applied to the store and the reading out of stored gain and offset data to the appropriate gain and offset blocks. This then includes the proper timing of the data transfers, manipulation of the bits to formulate data streams to read and write to various blocks, to take the address information from A-to-D converters 20 and 30, read the data stored at the appropriate addresses and write that data to the appropriate gain and offset blocks.

In a preferred embodiment, the function of processing and storing is performed by a microprocessor. Since the maximum rate of temperature changes is much slower than changes in the measured parameter, multiple readings of the A-to-D converter 30 will be made for each reading of A-to-D converter 20. For applications in which low output power is not a concern, the speed and bandwidth may be increased by using higher speed digital components. Accuracy of the system may be further improved by using higher resolution A-to-D converters, more digital memory and the taking of more test points between the operational parameters in the operational range of the device.

It may also be desirable to have a communications interface input to store 58 for calibration purposes i.e., transducer 12 can be biased through its measurement parameter range while the sensor is maintained at a series of temperatures over its operational range. The output can then be stored with the necessary corrections also stored so that the analog sensor output is both linear and accurate. After such a calibration ran, the measured temperature and measured parameter outputs merely address the appropriate correction to maintain the sensor output accurate during operation of the sensor.

It is noted that where an amplifier has several inputs it is important to adjust the gain of the amplifier first and then the offset. In each of the embodiments the input to the first amplifier is a function of both the signal input and the temperature and is compounded by nonlinearity and offsets contained in the transducer. In the two amplifier embodiments, the first amplifier is supplied with appropriate gain and offset corrections so as to minimize or eliminate errors relating to temperature changes in the transducer and thus the input to the second amplifier contains only transducer nonlinearities and offset which are removed by the appropriate adjustments to gain in the last stage amplifier.

In the single amplifier embodiment, both the temperature induced gain and offset errors and the transducer gain and offset errors are accommodated in a single amplifier step. As a result of all of the above embodiments, however, the analog sensor output is free from gain and offset errors induced by temperature changes and is also free of gain and offset errors induced by the parameter measurement device.

Figure 4:
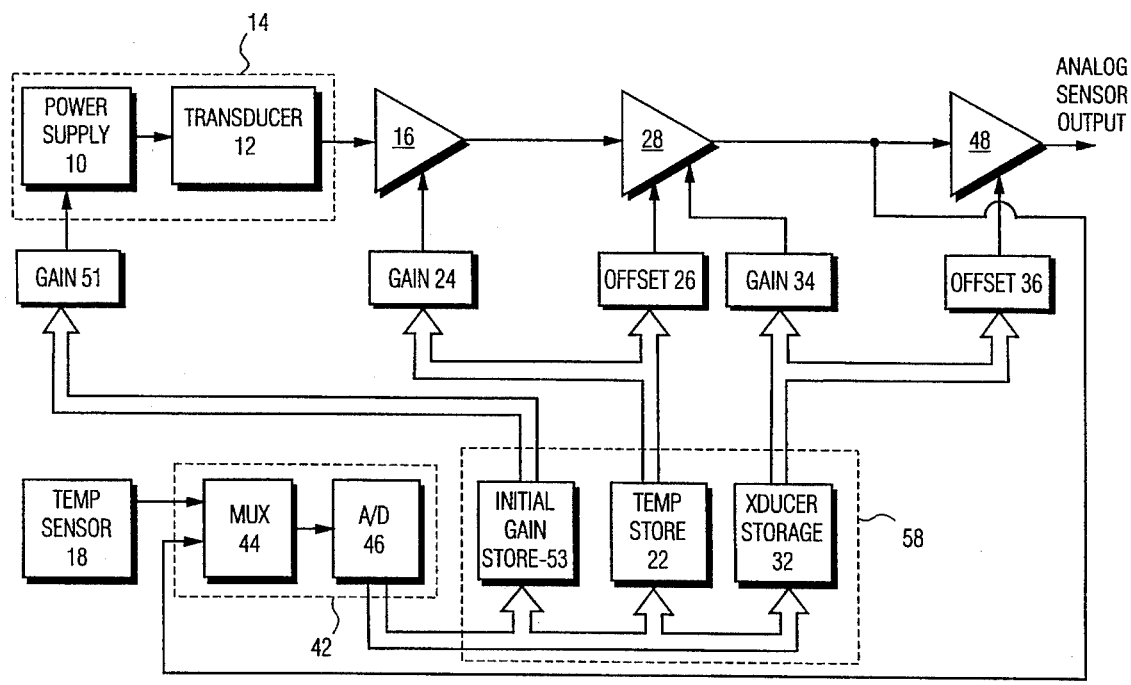
FIG. 4 is a block diagram illustrating an additional embodiment of the present invention.

The embodiment of FIG. 4 is a further modification of the smart sensor shown in FIG. 1. Dotted outline block 58 again represents the temperature gain/offset and measurement parameter gain/offset memory which include the functional blocks previously discussed in FIG. 1 of a temperature store 22 and transducer store 32. However, there is also a further functional block initial gain store 53 which stores parameters indicative of the particular bridge circuit being used. Initial gain store 53 provides a digital output to initial gain 51 which provides an analog output for adjusting the power supply 10 which provides the appropriate excitation voltage or current to the transducer 12. In this way, the particular characteristics of the different transducers can be taken into account without the necessity of recalibrating the sensor package each time the transducer is changed.

Temperature sensor 18 is shown as a separate block although it could be a separate resistor such as series resister 52 shown in FIG. 2. A temperature input is applied to the conversion block 42 which comprises a multiplexer 44 and an A-to-D convertor 46. Thus, the output of block 42 is a digital value which may address corrections in block 58 relating to the temperature sensed by temperature sensor 18. This digital address is applied to block 58 and provides the appropriate digital readouts from the initial gain store 53, the temperature store 22 and the transducer storage 32.

It is also noted that in FIG. 4 there is a further output amplifier 48 and the transducer gain 34 and transducer offset 36 are applied to amplifiers 28 and 48, respectively. The output of amplifier 28 is a signal indicative of the sensor parameter being measured, but without offset correction. While the output of amplifier 28 is supplied as an input to amplifier 48, it is also supplied as an input to multiplexer 44. In this way, the transducer nonlinearity (gain correction) and offset can be accessed by way of the digital address applied to transducer storage 32.

Figure 5A:
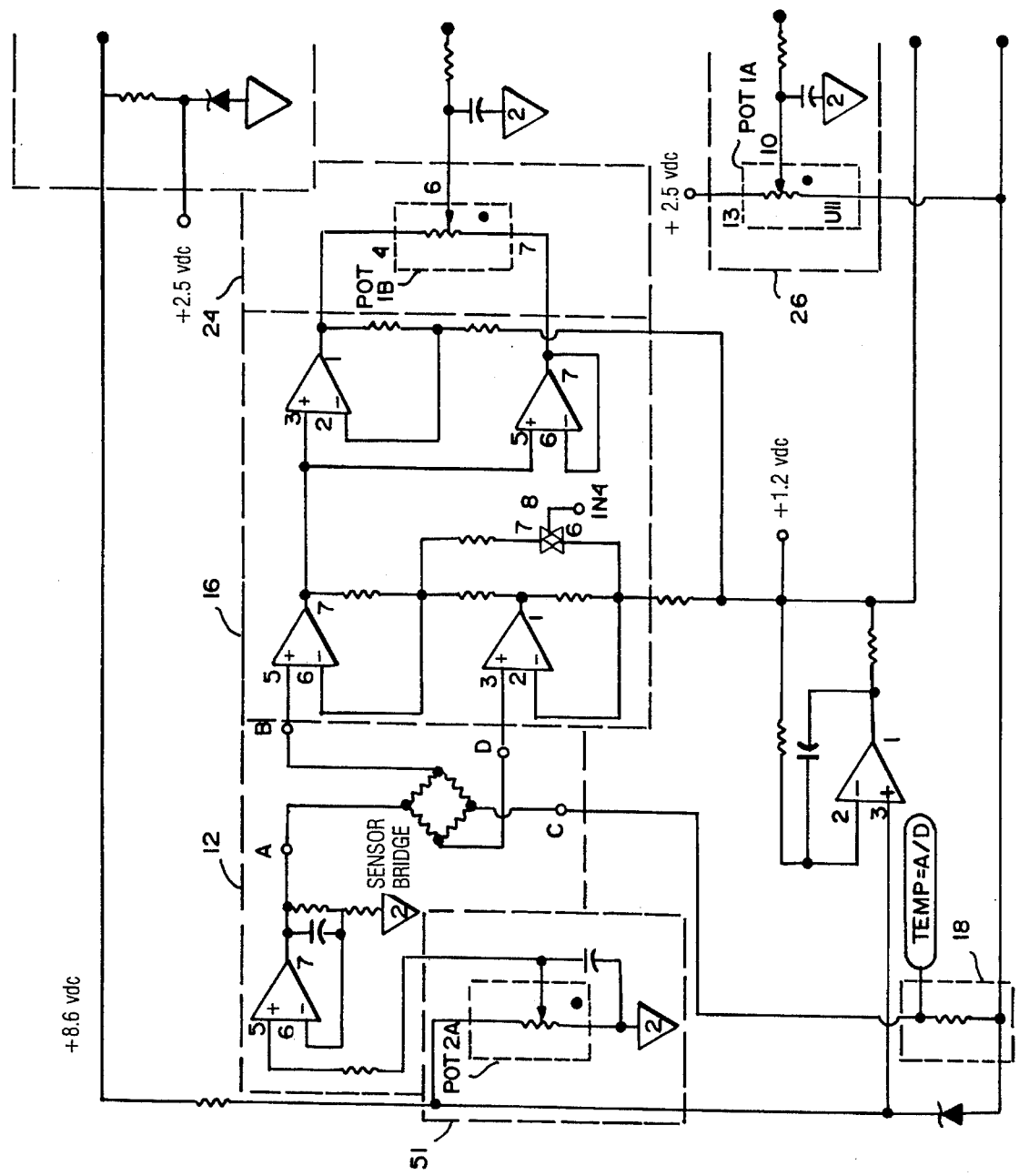
FIGS. 5A & 5B are a detailed circuit diagram illustrating the embodiment of FIG. 4.
Figure 5B:
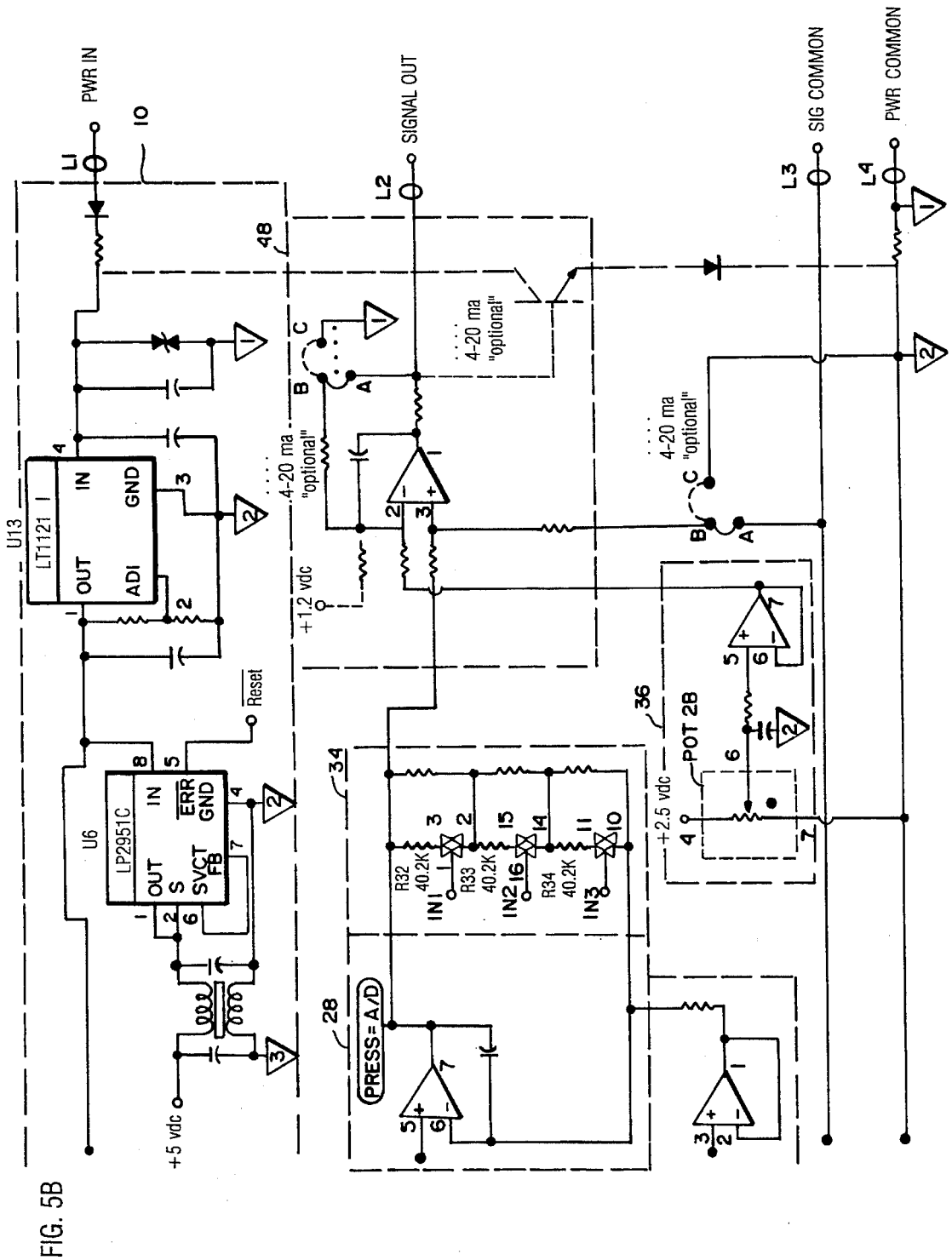
Figure 6:
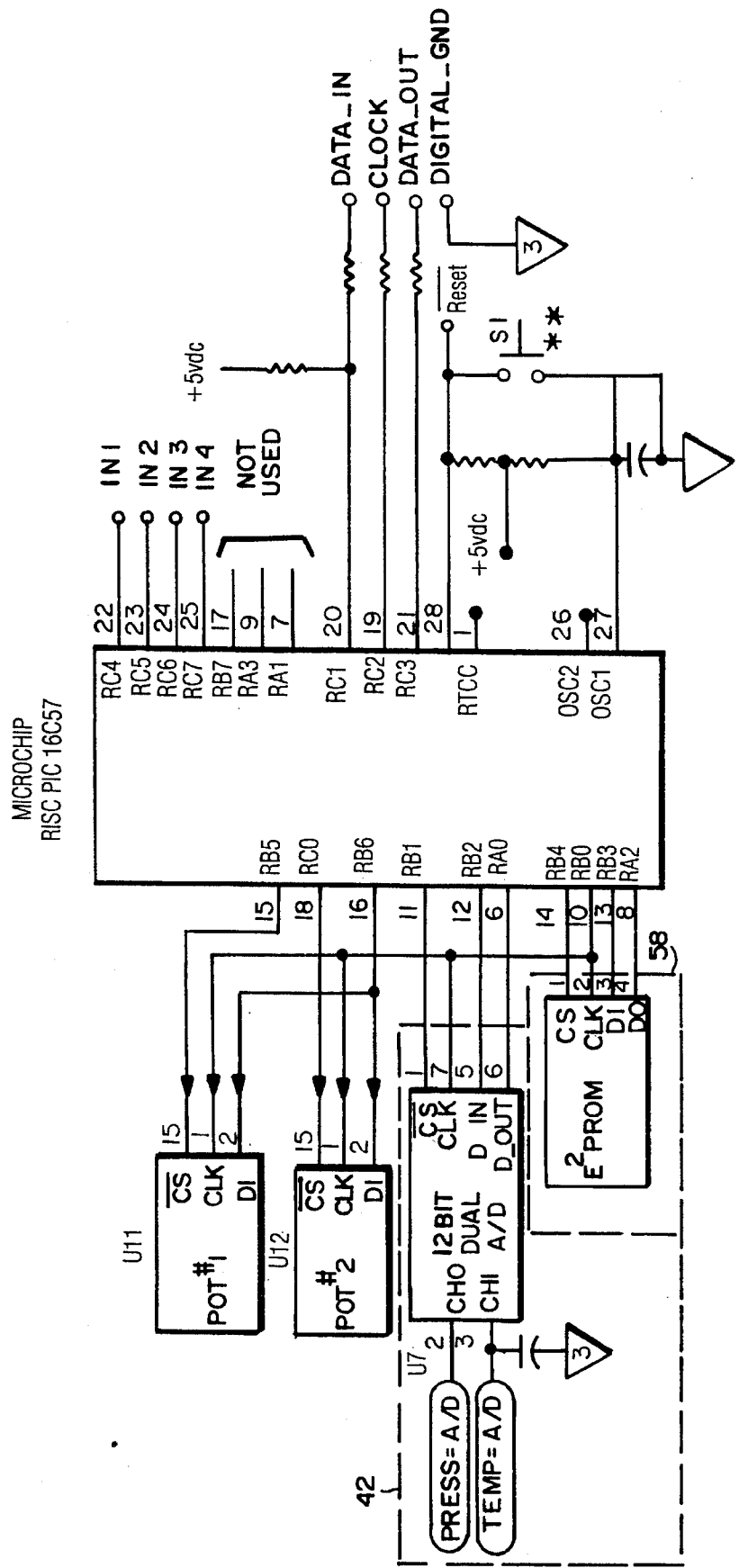
FIG. 6 is a data diagram illustrating the logic flow between the microprocessor and the various elements controlled by the microprocessor in FIGS. 5A & 5B.

The invention described in FIG. 4 can be applied to any sensor system and the present invention is not limited to a particular sensor system. However, in FIGS. 5A, 5B and 6 applicants have illustrated an advantageous circuit diagram where the invention of FIG. 4 is utilized in a pressure sensor embodiment. FIGS. 5A and 5B represent the actual circuit diagram with FIG. 6 representing a logic element circuit diagram. It will be apparent that there are interconnections between FIG. 6 and FIGS. 5A and 5B. The groups of elements in FIGS. 5A and 5B have been surrounded by dotted lines and the dotted line blocks have been labeled to correspond with the block diagram numbers illustrated in FIG. 4.

The individual circuit elements represented by the symbols in FIGS. 5A and 5B will be well known to those of ordinary skill in the art as will the appropriate values for capacitors and resistors. In the upper right hand corner of FIGS. 5A and 5B, the dotted line block 10 represents the elements which comprise a regulated power supply for providing 8.6 volts dc, 5 volts dc or 2½ volts dc depending upon which portion of the power supply output is tapped. It can be seen that the 8.6 volt dc supply is applied to initial gain 51 which comprises one of the solid state trim potentiometers previously discussed and it can be seen that the voltage pick off from the Pot 2A serves to adjust the voltage or current applied to the sensor bridge. Gain 51 is controlled by the digital output from the initial gain store 53 which is part of memory store 58. This is shown in FIG. 6 as dotted line 58 encompassing the E-PROM which comprises the initial gain store 53, the temperature store 22 and the transducer store 32. It can be seen that an output from the E-PROM is applied to Pots 1 and 2.

The temperature sensor 18 is shown as a resistor with the temperature sensor output being provided from FIG. 5A ("temp=A/D") which is a direct input to block 42. It is noted that in this embodiment the 12 bit dual A-to-D convertor provides both the multiplexing as well as the A-to-D conversion functions. Although not shown in FIG. 4, there is a controller which has as an input the address information from conversion block 42 as well as the other data in and clock in inputs and serves to control the distribution of the various outputs including the control of potentiometers 1A, 1B, 2A and 2B. This controller is shown in FIG. 6 and in a preferred embodiment, is a Microchip, Inc., Reduced Instruction Set Controller (RISC Model No. PIC16C57).

The output of the sensor bridge, which would be terminals B and D shown in FIG. 5A, is applied to amplifier 16 which is comprised of two preamplifiers and two amplifier stages. It will be seen that the output of the lower of the two amplifier stages includes a digitally controlled switch with the control input labelled IN4. It is noted that this switch is controlled directly by the RISC controller and is used for the initial calibration of the transducer.

The gain correction as a result of temperature in FIG. 4 is applied to control the gain of amplifier 16. This can be seen in FIG. 5A by reference to block 24 in which Pot 1B, again, in a preferred embodiment, a solid state trim potentiometer controlled directly by the RISC controller shown in FIG. 6, serves to adjust the gain of output signal and the pick off. This signal is seen as an input to amplifier 28 indicated in dotted line block 28 of FIG. 5B. It can be seen that the output of amplifier 28 is fed back as an input to the conversion block 42 (see the "Press equals A/D" legend which is electrically connected to the same legend as an input to the 12 bit dual A/D convertor contained within block 42).

The temperature store offset correction is also an input to amplifier 28 and this is shown in dotted line block 26 which incorporates Pot 1A and a related buffer amplifier. Again, Pot 1A, in a preferred embodiment, is a solid state trim potentiometer controlled by the RISC controller. As shown in FIG. 4, the gain in amplifier 28 is controlled by the series of 3 precision resistors R32, R33 and R34 (40.2KΩ) which in turn can be controllably connected or disconnected by the activation of electronic switches IN1, IN2 and IN3 under the direct control of the RISC controller. This gain control for amplifier 28 is used to correct for non-linearity of the transducer. The output of amplifier 28 is supplied as an input to the operational amplifier in dotted line block 48 comprising the output amplifier.

In the preferred embodiment, the output signal varies its voltage in a highly linear manner in relation to the parameter measured to the sensor. However, for some applications, a variable current is desirable. It can be seen in amplifier block 48 in FIG. 5B that there are a number of phantom line interconnections which are labeled "4–20 ma 'optional'." If it is desirable to have a 4–20 milliamp current output which varies in accordance with the sensor, each of the dotted line connections would be made. Moreover, at the output of the operational amplifier in the amplifier block 48, there are three dots labeled A, B and C with dots A and B bridged. This bridge would be disrupted and instead the dotted line bridge between B and C would be made. Similarly, as a connection between the "plus" input to the operational output in block 48, the connection between dots A and B would be disrupted and the dotted line connection between dots B and C made in order to provide the variable output current option. It can be seen that the transducer offset 36, as before, is a solid state trim Pot 2B operating under the control of the RISC controller and providing an input to the operational amplifier contained in the amplifier block 48.

As will be seen by one of ordinary skill in the art, the above circuitry provides a variable voltage or a variable current output indication of pressure variations where the sensor bridge is responsive to such pressure variations. After initial operation and calibration through a range of pressures and a range of temperatures, the correction factors stored in the E-PROM will result in highly accurate, highly linear outputs for a particular transducer. If it is necessary to substitute an additional transducer, as long as the correction parameters for this transducer have previously been stored in the E-PROM, it will continue to provide a highly accurate, highly linear output even though the sensor itself may have different characteristics from the original sensor.

In preferred embodiments, the resistive bridge is part of a pressure sensing transducer and thus the measured parameter is pressure (either gauge or absolute). In other embodiments, the measured parameter can be torque, tension/compression, acceleration/or any other parameter capable of being measured by a resistive bridge. The present invention provides substantial benefits over prior art transducer systems in that it retains the wide bandwidth and quick response of an analog sensor and yet incorporates the accuracy and linearity of a digitally corrected transducer system.

In accordance with the above, further applications and embodiments of the present invention will be readily apparent to those having ordinary skill in the relevant art. Therefore, the present invention is limited only by limitations incorporated into the following claims and is certainly not limited by the specific examples and embodiments discussed herein.

What is claimed is:

1. An apparatus for correction of temperature related and non-linearity related errors in the analog output of a transducer, said apparatus comprising:

(a) a measurement parameter transducer for providing an analog electrical output indicative of a measurement parameter being measured by the transducer;

(b) a temperature sensor providing an electrical output related to the temperature of said transducer;

(c) temperature gain and offset correction storage for storing gain corrections and offset corrections for a plurality of different temperatures and, responsive to the temperature sensor output, for providing a temperature gain correction output and a temperature offset correction output;

(d) an analog preamplifier having a preamplifier gain responsive to said temperature gain correction output and a preamplifier offset responsive to said temperature offset correction, for amplifying the transducer analog output and providing an analog preamplifier output;

(e) a measurement parameter gain and offset correction storage for storing measurement parameter gain and offset corrections for different values of said analog preamplifier output and, responsive to said analog preamplifier output, for providing an amplifier gain correction output and an amplifier offset correction output; and (f) an analog amplifier having an amplifier gain responsive to the amplifier gain correction output and an amplifier offset responsive to said amplifier offset correction output, for amplifying the analog preamplifier output and providing an amplified analog sensor output.

2. An apparatus for correction of temperature related and non-linearity related errors in the analog output of a transducer in accordance with claim 1, wherein said measurement parameter transducer comprises:

a power supply; and transducer, responsive to said power supply and changes in said measurement parameter, for providing said measurement parameter electrical analog output.

3. An apparatus for correction of temperature related and non-linearity related errors in the analog output of a transducer in accordance with claim 1, wherein said temperature gain and offset correction storage comprises:

a temperature A-to-D converter for converting said temperature related electrical output into a temperature digital address;

a digital storage device for storing a plurality of digital temperature gain and offset corrections at corresponding temperature digital addresses, and, responsive to said temperature digital address, for providing digital temperature gain and offset correction outputs; and means for converting said digital temperature gain and offset correction outputs to analog temperature gain and offset correction outputs.

4. An apparatus for correction of temperature related and non-linearity related errors in the analog output of a transducer in accordance with claim 1, wherein said measurement parameter gain and offset correction storage comprises:

a measurement parameter A-to-D converter for converting said measurement parameter electrical output into a measurement parameter digital address;

a digital storage device for storing a plurality of digital measurement parameter gain and offset corrections at corresponding measurement parameter digital addresses, and, responsive to said measurement parameter digital address, for providing digital measurement parameter gain and offset correction outputs; and means for converting said digital measurement parameter gain and offset correction outputs to an analog measurement parameter gain and offset correction output.

5. An apparatus for correction of temperature related and non-linearity related errors in the analog output of a transducer in accordance with claim 1:

wherein said measurement parameter transducer comprises:
  a power supply; and
  transducer, responsive to said power supply and changes in said measurement parameter, for providing said measurement parameter electrical analog output, wherein said temperature gain and offset correction storage comprises:
  a temperature A-to-D converter for converting said temperature related electrical output into a temperature digital address;
  a digital storage device for storing a plurality of digital temperature gain and offset corrections at corresponding temperature digital addresses, and, responsive to said temperature digital address, for providing digital temperature gain and offset correction outputs; and
  means for converting said digital temperature gain and offset correction outputs to analog temperature gain and offset correction outputs; and wherein said measurement parameter gain and offset correction storage comprises:
  a measurement parameter A-to-D converter for converting said measurement parameter electrical output into a measurement parameter digital address;
  a digital storage device for storing a plurality of digital measurement parameter gain and offset corrections at corresponding measurement parameter digital addresses, and, responsive to said measurement parameter digital address, for providing digital measurement parameter gain and offset correction outputs; and means for converting said digital measurement parameter gain and offset correction outputs to an analog measurement parameter gain and offset correction output.

6. An apparatus for correction of temperature related and non-linearity related errors in the analog output of a transducer, said apparatus comprising:

(a) a measurement parameter transducer for providing an analog output indicative of a measurement parameter being measured by the transducer, said transducer including a bridge circuit, said bridge circuit comprised of a plurality of resistors, at least one of said resistors having a resistance which varies as a function of the measurement parameter, including at least one resistor providing an electrical output related to the temperature of said transducer;

(b) temperature gain and offset correction and measurement parameter gain and offset correction storage for (1) storing a plurality of temperature gain and offset corrections for a plurality of different temperatures and, responsive to the temperature related output, for providing a temperature gain and offset correction output and (2) for storing a plurality of measurement gain and offset corrections for different values of said measurement parameter output and, responsive to said measurement parameter output, for providing a measurement parameter gain and offset correction output; and (c) an amplifier having an amplifier gain, responsive to said measurement parameter output, for amplifying the measurement parameter output and providing an amplifier analog sensor output, said amplifier output is responsive to said temperature gain and offset correction output and said measurement parameter gain and offset correction output.

7. An apparatus for correction of temperature related and non-linearity related errors in the analog output of a transducer in accordance with claim 6, wherein said amplifier comprises:

a first amplifier having a first amplifier gain, responsive to said measurement parameter output, for amplifying the measurement parameter output and providing a first amplifier analog output, said first amplifier output is responsive to said temperature gain and offset correction outputs; and a second amplifier having a second amplifier gain, responsive to said first amplifier analog output, for amplifying the first amplifier analog output and providing a second amplifier analog sensor output, said Second amplifier analog sensor output is responsive to said measurement parameter gain and offset correction outputs.

8. An apparatus for correction of temperature related and non-linearity related errors in the analog output of a transducer in accordance with claim 7, wherein said measurement parameter transducer comprises:

a tour resistor bridge circuit where each junction between said resistors is identified as (a), (b), (c), and (d), with said analog output at junctions (b) and (d); and a power supply connected to junction (a) of said bridge circuit.

9. An apparatus for correction of temperature related and non-linearity related errors in the analog output of a transducer in accordance with claim 8, wherein said power supply comprises a constant voltage power supply and said at least one resistor comprises a resistor separate from said bridge circuit and connected between junction (c) and ground, and any voltage drop across said separate resistor comprises said temperature related output.

10. An apparatus for correction of temperature related and non-linearity related errors in the analog output of a transducer in accordance with claim 8, wherein said power supply comprises a constant current power supply and said at least one resistor comprises the resistors in said bridge circuit and the resistance changes measured across junctions (a) and (c) comprises said temperature related output.

11. An apparatus for correction of temperature related and non-linearity related errors in the analog output of a transducer in accordance with claim 7, wherein said temperature gain and offset correction and measurement parameter gain and offset correction storage comprises:

a temperature A-to-D converter for converting said temperature related electrical output into a temperature digital address;

a measurement parameter A-to-D converter for converting said measurement parameter electrical output into a measurement parameter digital address;

a digital storage device for storing a plurality of digital temperature gain and offset corrections at corresponding temperature digital addresses, and, responsive to said temperature digital address, for providing digital temperature gain and offset correction outputs and for storing a plurality of digital measurement parameter gain and offset corrections at corresponding measurement parameter digital addresses, and, responsive to said measurement parameter digital address, for providing digital measurement parameter gain and offset correction outputs;

means for converting said digital temperature gain and offset correction outputs to analog temperature gain and offset correction outputs; and means for converting said digital measurement parameter gain and offset correction outputs to analog measurement parameter gain and offset correction outputs.

12. An apparatus for correction of temperature related and non-linearity related errors in the analog output of a transducer in accordance with claim 6, wherein said temperature gain and offset correction and measurement parameter gain and offset correction storage comprises:

a temperature A-to-D converter for converting said temperature related electrical output into a temperature digital address;

a measurement parameter A-to-D converter for converting said measurement parameter electrical output into a measurement parameter digital address;

a digital storage device for storing a plurality of digital temperature gain and offset corrections at corresponding temperature digital addresses, and, responsive to said temperature digital address, for providing digital temperature gain and offset correction outputs and for storing a plurality of digital measurement parameter gain and offset corrections at corresponding measurement parameter digital addresses, and, responsive to said measurement parameter digital address, for providing digital measurement parameter gain and offset correction outputs;

means for converting said digital temperature gain and offset correction outputs to analog temperature gain and offset correction outputs; and means for converting said digital measurement parameter gain and offset correction outputs to analog measurement parameter gain and offset correction outputs.

13. An apparatus for correction of temperature related and non-linearity related errors in the analog output of a transducer in accordance with claim 12, wherein said measurement A-to-D converter includes a preamplifier.

14. An apparatus for correction of temperature related and non-linearity related errors in the analog output of a transducer, said apparatus comprising:

(a) a measurement parameter transducer for providing an analog output indicative of a measurement parameter being measured by the transducer, said transducer including a bridge circuit and a power supply for driving said bridge circuit, said bridge circuit comprised of a plurality of resistors, at least one of said resistors having a resistance which varies as a function of the measurement parameter, including at least one resistor providing an electrical output related to the temperature of said transducer;

(b) temperature gain and offset correction and measurement parameter gain and offset correction storage for (1) storing a plurality of temperature gain and offset corrections for a plurality of different temperatures and, responsive to the temperature related output, for providing temperature gain and offset correction outputs and (2) for storing a plurality of measurement gain and offset corrections for different values of said measurement parameter output and, responsive to a first amplifier analog output, for providing measurement parameter gain and offset correction outputs;

(c) a first amplifier having a first amplifier gain, responsive to said measurement parameter output, for amplifying the measurement parameter output and providing a first amplifier analog output, said first amplifier output is responsive to said temperature gain and offset correction outputs; and (d) a second amplifier having a second amplifier gain, responsive to said first amplifier analog output, for amplifying the first amplifier analog output and providing a second amplifier analog sensor output, said second amplifier analog sensor output is responsive to said measurement parameter gain and offset correction outputs.

15. An apparatus for correction of temperature related and non-linearity related errors in the analog output of a transducer in accordance with claim 14, wherein said power supply comprises a constant voltage power supply and said at least one resistor comprises a resistor separate from said bridge circuit and connected between junction (c) and ground, and any voltage drop across said separate resistor comprises said temperature related output.

16. An apparatus for correction of temperature related and non-linearity related errors in the analog output of a transducer in accordance with claim 14, wherein said power supply comprises a constant current power supply and said at least one resistor comprises the resistors in said bridge circuit and the resistance changes measured across junctions (a) and (c) comprises said temperature related output.

* * * * *